(12) United States Patent
Habeeb

(10) Patent No.: US 8,841,454 B2
(45) Date of Patent: Sep. 23, 2014

(54) FUNCTIONALIZED CARBON NANOSTRUCTURES WHICH ARE SOLUBLE IN HYDROCARBONS AND METHOD FOR PREPARATION

(75) Inventor: Jacob Joseph Habeeb, Westfield, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 393 days.

(21) Appl. No.: 12/835,453

(22) Filed: Jul. 13, 2010

(65) Prior Publication Data

US 2011/0015423 A1    Jan. 20, 2011

Related U.S. Application Data

(60) Provisional application No. 61/271,142, filed on Jul. 17, 2009.

(51) Int. Cl.
| | |
|---|---|
| C07D 471/04 | (2006.01) |
| B82Y 30/00 | (2011.01) |
| C01B 31/02 | (2006.01) |
| B82Y 40/00 | (2011.01) |

(52) U.S. Cl.
CPC ............ C01B 31/0273 (2013.01); B82Y 30/00 (2013.01); C01B 31/0293 (2013.01); B82Y 40/00 (2013.01); C01B 31/0213 (2013.01)
USPC ........................................... 546/113; 548/400

(58) Field of Classification Search
USPC .......................................... 548/400; 546/113
See application file for complete search history.

(56) References Cited

U.S. PATENT DOCUMENTS

| 5,739,376 A | 4/1998 | Bingel |
|---|---|---|
| 6,187,823 B1 | 2/2001 | Haddon et al. |
| 2003/0065206 A1* | 4/2003 | Bolskar et al. .................. 558/87 |
| 2004/0208816 A1 | 10/2004 | Mashino |
| 2006/0210466 A1 | 9/2006 | Mitra et al. |
| 2011/0015106 A1 | 1/2011 | Habeeb et al. |

FOREIGN PATENT DOCUMENTS

| CN | 1587031 A | 3/2005 |
|---|---|---|
| CN | 1730631 A | 2/2006 |
| JP | 57067510 A | 4/1982 |
| JP | 2004168570 A | 6/2004 |
| TW | 200724485 A | 7/2007 |
| WO | WO 94/25424 | 11/1994 |
| WO | WO 2004/050554 A1 | 6/2004 |
| WO | WO 2006/130150 A2 | 12/2006 |

OTHER PUBLICATIONS

Tomokazu Umeyama, et al., "Retention of Intrinsic Electronic Properties of Soluble Single-Walled Carbon Nanotubes after a Significant Degree of Sidewall Functionalization by the Bingel Reaction", J Phys. Chem, C2007, 111, 9734-9741.
Dirk M. Guldi, et al., "Supramolecular Hybrids of [60] Fullerene and Single-Wall Carbon Nanotubes", Chem. Eur. J., 2006, 12, 3975-3983.
Guojian Wang, et al., "Modification of carbon nanotubes by chemical reaction", Journal; General Review, 2006, 18, 10, 1305-1312 (Abstract Only).
Jarad M. Ashcroft, et al., "Functionalization of individual ultra-short single-walled carbon nanotubes", Nanotechnology 17, 2006, 5033-5037.
C. S. Chen, et al., "Modification of multi-walled carbon nanotubes with fatty acid and their tribological properties as lubricant additive", Carbon, 43, 2005, 1660-1666.
Andreas Hirsch, et al., "Functionalization of Carbon Nanotubes", Top Curr Chem., 2005, 245, 193-237.
Wan-Joong Kim, et al., "Functionalization of Shortened SWCNTs Using Esterification", Bull. Korean Chem. Soc., 2004, vol. 25, No. 9, 1301-1302.
Chuan-Sheng Chen, et al., "Chemical Modification of Carbon Nanotubes and Tribological Properties as Lubricant Additive", Acta Chimica Sinica, vol. 62, No. 14, 1367-1372, 2004.
Kimberly A. Worsley, et al., "Long-Range Periodicity in Carbon Nanotube Sidewall Functionalization", Nano Letters, 2004, vol. 4, No. 8, 1541-1546.
Hui Hu, et al., "Sidewall Functionalization of Single-Walled Carbon Nanotubes by Addition of Dichlorocarbene", JACS, 2003, 125, 14893-14900.
Karl S. Coleman, et al., "Functionalization of Single-Walled Carbon Nanotubes via the Bingel Reaction", JACS, 2003, 125, 8722-8723.
Ya-Ping Sun, et al., "Soluble Dendron-Functionalized Carbon Nanotubes: Preparation, Characterization, and Properties", Chem. Mater., 2001, 13, 2864-2869.
F. M. Menger, et al., "Specific Enzyme-Induced Decapsulation", J. Am. Chem. Soc., 1991, 113, 5467-5468.
Saul Wolfe, et al., "Synthesis and decarboxylation of $\Delta^2$-cephem-4,4-dicarboxylic acids", Can. J. Chem, 79, 2001, 1238-1258.
Kiyoshi Matsumoto, et al., "Reaction of Pyridinium Bis(Methoxycarbonyl) Methylid with Diphenyl-Cyclopropenethione: A Revised Structure for One of the Products", Heterocycles, vol. 23, No. 8, 1985, 2041-2043.

* cited by examiner

Primary Examiner — Yong Chu
Assistant Examiner — Sonya Wright
(74) Attorney, Agent, or Firm — Robert A. Migliorini; Joseph J. Allocca

(57) ABSTRACT

Carbon nanomaterials functionalized on their surface with ester or amide functionality are made using a technique involving multiple space apart in time or dropwise additions of reactants to the carbon nanomaterials, and are soluble in hydrocarbon liquids.

6 Claims, No Drawings

FUNCTIONALIZED CARBON NANOSTRUCTURES WHICH ARE SOLUBLE IN HYDROCARBONS AND METHOD FOR PREPARATION

CROSS-REFERENCE TO RELATED APPLICATIONS

This is a Non-Provisional Application that claims priority to U.S. Provisional Application No. 61/271,142 filed Jul. 17, 2009, which is herein incorporated by reference in its entirety.

BACKGROUND OF THE INVENTION

1. Field of the Invention

The present invention relates to functionalized carbon nanostructures and to their preparation.

2. Description of the Related Art

Carbon nanotubes and fullerene materials are the subject of much current interest. Such materials are not soluble in aqueous, organic or hydrocarbon solvents so efforts have been made to functionalize them to render them soluble in one or more solvent categories.

U.S. Pat. No. 6,187,823 is directed to solubilizing single-walled carbon nanotubes by direct reaction with amines and alkylaryl amines having an uninterrupted carbon chain of at least 5 and preferably 9 carbon atoms in length. The single-walled carbon nanotubes are terminated with carboxylic acid groups, then the carboxylic acid groups are reacted with an amine such as nonylamine or octadecylamine or an alkylaryl amine such as 4-pentylaniline or 4-tetracontylaniline, in an appropriate solvent such as toluene, chlorobenzene, dichlorobenzene, dimethylformamide (DMF) heramethylphosphoramide, dimethylsulfoxide (DMSO) with heating at between 50 to 200° C.

U.S. Published Application U.S. 2003/0065206 is directed to derivatization and solubilization of insoluble classes of carbon nanomaterials which include fullerenes, including very high molecular weight fullerenic materials generated in fullerenic soot, giant fullerenes, fullerenic polymers, carbon nanotubes and metal-carbon nanoencapsulates. The method involves cyclopropanation of the exterior surface of the fullerene or carbon nanotubes. The derivatives formed are described as exhibiting increased solubility in solvents to commonly employed, e.g., non-polar hydrocarbons and arene solvents. The cyclopropanation reaction can be performed on fullerenes or carbon nanotubes, the surfaces of which are devoid of any prior functionalization or on fullerenes or carbon nanotubes which have been previously functionalized yet remain insoluble in solvents. The process involves the cyclopropanation reaction as previously applied to soluble fullerenes by Bingel et al. which involves base-induced deprotination of alpha halo substituted bis-malonates, see e.g. U.S. Pat. No. 5,739,376. The nucleophilic carbanion adds to the fullerene or carbon nanotubes surface, making a new carbon-carbon bond, followed by elimination of the halide ion, completing the cyclopropanation and leaving a derivative group positioned 1, 2 across a carbon-carbon double bond of the fullerene or carbon nanotubes. The reaction is carried out in a heterogeneous mixture in a polar aprotic solvent, e.g. ether, tetrahydrofuran, 1,4-dioxane, dimethoxy-ethane or miscible mixtures thereof. The method is reported as being rapid, does not require heating and does not require the use of strongly coordinating and reactive bases such as amine DBU, but the use of sub-stoichiometric levels of soluble bases such as nitrogen bases and DBU in the presence of an excess quantity of a proton scavenger is also disclosed.

Various cyclopropanation reagents are described, including:

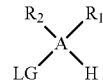

wherein A is a carbon or silicon atom;
LG is the leaving group which includes —Cl, —Br, —I, —OSO$_2$R where R is an optionally substituted alkyl or aryl group;
R$_1$ and R$_2$ are independently selected from the group consisting of optionally-substituted alkyl, alkenyl, alkynyl or aryl groups, —COOR$_3$ groups, —O—CO—R$_3$ groups, —COR$_3$ groups, —CO—NR$_3$R$_4$ groups, —O—CO—NR$_3$R$_4$ groups, —CN, —PO(OR$_3$)(OR$_4$) groups, and —SO$_2$R$_3$ groups wherein R$_3$ and R$_4$ are independently selected from hydrogen, an alkyl group, alkenyl group, alkynyl group or aryl group, any one of which may be optionally further substituted. Preferably R$_1$ and R$_2$ are both —COOR$_3$ groups.

At paragraph [0134] a sample of single-walled nanotubes was reacted under modified Bingel-type conditions with diethylbromomalonate. It is stated that the derivatization protocol works on single-walled nanotubes, multi-walled nanotubes, nanotubes of varied diameter and both natural length and chemically-shortened nanotubes.

Derivatization renders the derivatized species soluble in common non-polar solvents. Solubility is defined as the dissolution of free molecules (or salts) in the solvent with reversibility to remove the solvent to recover the dissolved molecules or salts. Non-polar solvents are identified as including non-polar organic solvents such as hydrocarbons, and arenes and halogenated arenes, including toluene and benzene.

U.S. Pat. No. 5,739,376 is directed to fullerene derivatives, methods of preparing derivatized fullerenes and methods of using derivatized fullerenes. The fullerene is derivatized using materials of the formula:

wherein E$^1$ and E$^2$ are identical or different and are each COOH, COOR, CONRR', CHO, COR, CN, P(O)(OR$_2$) and SO$_2$R where R and R' are each a straight-chain or branched aliphatic radical (C$_1$ to C$_{20}$) which may be unsubstituted, monosubstituted or polysubstituted, and X is —Cl, —Br, —I, —OSR$_2$Ar, —OSO$_2$CF$_3$, —OSO$_2$C$_4$F$_9$.

The cyclopropanation reaction is carried out in a base such as alkali metal hydride, alkali metal hydroxide, alkoxide, amide, amine, guanidine at from –78 to 180° C.

The final product can be made directly by using a material:

wherein E$^1$ and E$^2$ are already in their final desired form or intermediate cyclopropanated fullerenes wherein E$^1$ and E$^2$ are esters can be saponified to give E$^1$ to E$^2$ as corresponding acids, or wherein $E^1$ and $E^2$ are alcohols which are reacted with an acid to give esters of the desired carbon number.

U.S. Published Application U.S. 2006/0210466 is directed to the production of functionalized nanotubes using microwave radiation. The nanotubes material is combined with the functionalizing reactant such as an acid, base, urea, alcohol, organic solvent, benzene, acetone or any other reactant that achieves the desired functionalization reaction, then the mixture is subjected to appropriate microwave conditions to affect the desired functionalization.

"Retention of Intrinsic Electronic Properties of Soluble Single-Walled Carbon Nanotubes after a Significant Degree of Sidewall Functionalization by the Bingel Reaction", Tomohazu Umegama, et al., J. Phys. Chem. C 2007, 111, 9734-9741 reports single-walled carbon nanotubes functionalized at tips and defect sites with multiple alkyl-substituents and on sidewalls with phenyl-substituents to give sufficient solubility to the nanotube derivatives in organic solvents. Sidewall functionalization utilized the Bingel reaction. This article also reports the shortening of single-walled nanotubes using treatment with HCl and $HNO_3$ aqueous solutions, leaving shortened single-walled carbon nanotubes with carboxylic groups at the upper ends (or tips) and at surface defect sites. These can be reacted with amine materials to yield amide functionalized single-walled carbon nanotubes exhibiting improved dispersibility in common organic solvents such as chloroform, orthodichlorobenzene, tetrahydrofuran.

"Functionalization of Individual Ultra-Short Single-Walled Carbon Nanotubes", Jared M. Ashcroft, et al., Nanotechnology 17 (2006), 5033-5037 reports the functionalization of 20-80 nm length single-walled carbon nanotubes via in-situ Bingel cyclopropanation. The single-walled carbon nanotubes are shortened via fluorination followed by pyrolysis which both shortens the nanotubes and creates sidewall defects through which various agents can be internally loaded. The shortened single-walled carbon nanotubes are functionalized via the Bingel reaction using a bromomalonate and sodium hydride (NaH) or the Bingel-Hersch reaction using $CBr_4$ and DBU.

"Modification of Multi-Walled Carbon Nanotubes with Fatty Acids and Their Tribological Properties as Lubricant Additives", C. S. Chen, et al., Carbon 43 (2005), 1660-1666 teaches the treatment of multi-walled carbon nanotubes with a mixture of sulfuric acid and nitric acid to produce an oxidized material which was then boiled in HCl for two hours. The oxidized material was mechanically milled, then sonically mixed with stearic acid in deionized water to which was added sulfuric acid with additionally refluxing at 100° C. for two hours. The reaction mixture was cooled, then extracted with chloroform. Ball milled oxidized multi-walled carbon nanotubes and balled-milled stearic acid modified oxidized multi-walled carbon nanotubes were dispersed in pure liquid paraffin through sonication and stirring. Friction and wear tests were performed. The liquid paraffin containing the stearic acid modified multi-walled nanotubes presented lower friction coefficient and wear loss than did the pure liquid paraffin or the liquid paraffin-containing just the ball milled oxidized multi-walled nanotubes. Wear loss and friction coefficient decreased with increasing mass rates of stearic acid to oxidized multi-walled nanotubes up to a mass ratio of 2.Beyond 2, the friction coefficient and wear loss increased.

"Functionalization of Single-Walled Carbon Nanotubes via the Bingel Reaction", Karl S. Coleman, et al., J. Am. Chem. Soc. 2003, 125, 8722-8723 teaches the cyclopropanation of single-walled carbon nanotubes. Single-walled carbon nanotubes were annealed under vacuum at 1000° C. for three hours to remove any carboxylic acid groups present on the surface. The decarboxylated single-walled carbon nanotubes were suspended in dry orthodichlorobenzene (ODCB) to which was added diethyl bromomalonate and 1,8-diazabicyclo[5.4.0]undecene (DBU). The mixture was reacted with stirring for two hours and a modified single-wall nanotubes material bearing >C(COO Et)$_2$ groups on the sidewall was isolated. This material was then either trans-esterified with 2-(methylthio) ethanol in diethyl ether and further contacted with a gold colloid to produce functionalized single-walled carbon nanotubes with gold attached to the functional group, or the material was trans-esterified with the sodium or lithium salt of 1H,1H,2H,2H-perfluoro decan-1-ol. These reactions resulted in the introduction of chemical markers into the single-walled carbon nanotubes to facilitate atomic force microscopy visualization and $^{19}F$ NMR and XPS spectroscopy for surface characterization.

DESCRIPTION OF THE INVENTION

The present invention is directed to functionalized carbon nanostructure materials and to a method for their preparation.

Carbon nanostructure materials which are functionalized include, by way of example and not limitation, nanohorns, fullerenes, nanoanions, single-walled nanotubes, multiwalled nanotubes and nonocomposites which may or may not have had their surfaces decarboxylated, preferably which have had their surfaces dicarboxylated. More particularly, the functionalized carbon nanostructure materials are functionalized carbon nanotubes, preferably single-wall nanotubes, more preferably short single-wall carbon nanotubes, and which have had their surfaces decarboxylated.

Fullerenes are cage-like carbon allotropes of the formula ($C_{20+2m}$) (where m is an integer). They contain twelve five-membered rings and also any number, but at least two, six-membered rings of carbon atoms. The most well known fullerene is the C60 fullerene, also commonly identified as "buckyball".

Of the numerous carbon nanostructure materials, carbon nanotubes have become the most interesting.

Carbon nanotubes can be single-walled or multi-walled materials.

Multi-walled carbon nanotubes consist of concentrically nested tube-like graphene structures with each successive concentric shell having a larger diameter than the next inner shell which it surrounds. Multi-walled carbon nanotubes can contain from two to multiple dozens of concentric tubes.

Single-walled carbon nanotubes, as the name implies, consist of a single tubular carbon graphene structure, i.e. a single layer of carbon atoms. Single-walled carbon nanotubes, therefore, ideally comprise a single layer of hexagonal carbon rings (a graphene sheet) that has rolled up to form a seamless cylinder. Incomplete rollup nanotubes may also results in holes (defects) in the nanotubes.

Such cylinders have diameters of anywhere from 0.05 to 2 micron, preferably 0.1 to 1 micron and lengths of many nanometers, even many centimeters, for an extremely high length to diameter ratio.

Preferably the carbon nanostructure material which is functionalized in the process of the present invention is a short single-walled carbon nanotube and which preferably has had its surfaces decarboxylated. The invention will be described hereinafter with reference to the non-limiting example of short single-walled carbon nanotubes.

The functionalized short single-walled carbon nanotubes are single-walled carbon nanotubes between 1 to 10, preferably 1 to 0.5, microns in length and 0.01 to 50 nanometers in diameter and bear at their edges and along the sidewall functional groups of the structure:

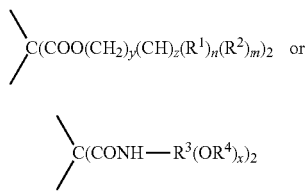

wherein $R^1$ and $R^2$ are the same or different and are selected from hydrogen or $C_1$ to $C_{18}$ alkyl groups provided at least one of $R_1$ and $R_2$ is not hydrogen, preferably $R_1$ and $R_2$ in total amount to at least 14 carbons, y is 0 to 10, preferably 0 to 5, more preferably 1, Z is 0 or 1, preferably 1, n and m are integers ranging from 0 to 2 provided n+m is at least 1, $R^3$ is a $C_1$ to $C_{15}$ alkyl or $C_6$ to $C_{10}$ aryl group, $R^4$ is a $C_2$ to $C_{14}$ alkyl group, $C_6$ to $C_{10}$ aryl, $C_1$ to $C_{10}$ alkylaryl or $C_1$ to $C_{10}$ arylalkyl group, and x is an integer ranging from 0 to up to the replaceable valance of the $R^3$ group, preferably 1 to 3.

Short single-walled carbon nanotubes are secured either by starting with single-walled carbon nanotubes of the aforesaid length or, alternatively, long single-walled carbon nanotubes are shortened by oxidation using an aqueous solution of $HNO_3$ of 1 to 7 molar strength or a mixture of HCl and $HNO_3$ at a 3 to 1 volume ratio of concentrated HCl to concentrated $HNO_3$ or 3 to 1 volume ratio of concentrated $H_2SO_4$ and $HNO_3$ producing single-walled carbon nanotubes of reduced length but containing carboxylic groups along the edges and at surface sidewall defect sites. The short single-walled carbon nanotubes are subjected to annealing at high temperatures, to decarboxylate the short single-walled carbon nanotubes. Procedures to shorten long single-walled carbon nanotubes are known in the art; see for example Bull. Korean Chem. Society 2004, Vol. 25, No. 9, 1301-1302 and for decarboxylating carbon nanotubes; see for example JACS 2003, 125, 8722-8723.

The carbon nanostructure material, preferably decarboxylated short single-walled carbon nanotubes, are 100% carbon surface materials subjected to [2+1] cyclopropanation using:

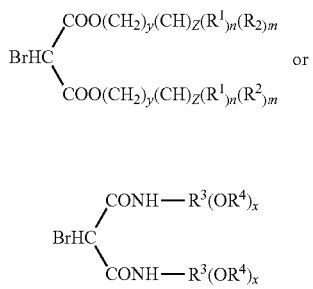

wherein $R^1$, $R^2$, $R^3$, $R^4$, y, Z, m, n and x are as previously defined wherein the carbon nanostructure material, preferably decarboxylated short-walled carbon nanotubes, is suspended in chlorinated benzene, preferably dry orthodichlorobenzene, and the materials of formula I or II and 1,8-diazabicyclo[5.4.0] undecene (DBU) are added to the suspended carbon nanostructure material in chlorinated benzene in multiple additions over time or dropwise over time to yield the desired functionalized carbon nanostructure material which is distinguished by having at least twice the level of functionalization as compared to functionalized carbon nanomaterial made using the same materials of formula I or II and the DBU as are added in the multiple additions or dropwise but which are added all at once in a single addition, and even if the same total amount of such materials are added all at once in a single addition as is added in total in the multiple additions or dropwise. By multiple additions as used herein and in the appended claims is meant that the suspended carbon nanostructure material is mixed with quantities of materials of formula I or II and DBU at least twice, preferably at least three times, or more, over time with intervals between each addition sufficient for reaction to occur between the suspended carbon nanostructure material and the material of formula I or II in the presence of the DBU, such interval being at least six hours, preferably six hours to four days, more preferably twelve hours to four days. Alternatively, materials of formula I or II and the DBU can be added to the carbon nanostructure material dropwise over time, preferably over a period of at least two days, more preferably over a period of at least four days, with stirring at a drop rate of one drop every thirty seconds to thirty minutes, preferably one to ten minutes. The temperature is held at from 40 to 70° C., preferably 50 to 60° C., during each addition of the multiple addition or during the dropwise addition and for one to four days, preferably three days, following the final addition step practiced by the practitioner, the choice between dropwise addition and multiple additions and of the number of additions or the duration of the dropwise additions being left to the discretion of the practitioner provided that if the multiple addition procedure is adopted, there are at least two additions of the materials of formula I or II in DBU to the carbon nanomaterial suspended in the chlorinated benzene.

In another embodiment, the carbon nanostructure material, preferably short single-walled carbon nanotube material, more preferably decarboxylated short single-wall nanotube material, is suspended in chlorinated benzene and materials of formula III:

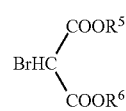

wherein $R^5$ and $R^6$ are the same or different, preferably the same, and are selected from methyl, ethyl or propyl groups, preferably methyl groups, and DBU are added to the suspended carbon nanostructure material in multiple additions over time or dropwise over time to yield an intermediate product of the formula:

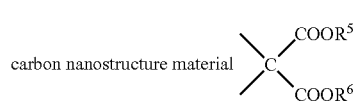

The terms "multiple additions" and "dropwise" in this embodiment have the same meaning as previously recited except in this instance it is material III which is being added in the described manner. By so doing, the surface of the carbon nanostructure material, and in the case of the shortened single-walled carbon nanotubes, both the surface of the walls and the tips at the end of the tubes, are substituted with the

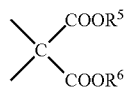

in an amount at least twice the level of substitution obtained when the carbon nanostructure material is reacted with material of formula III and the DBU in a single addition.

The material of formula IV is then subjected to transesterification or trans-amidation using esterification or amidation agents of the type and formula which when reacted with the material of formula IV result in the production of a functionalized carbon nanostructure material bearing functional groups corresponding to functional groups previously identified as (a) or (b), the transesterification or amidation reaction being conducted at a temperature in the range of from 0 to 65° C. in an appropriate catalyst such as Group I alkali metal hydroxide in a chlorobenzene solvent such as ODCB.

The amount of esterification or amidation agent used is an amount sufficient to fully esterify or amidate the material of formula IV. By fully esterify or amidate is meant adding quantities of esterification or amidation reactant sufficient so that upon spectroscopic analysis of the product the addition of more of such reactant does not result in any change in the spectrum.

Example

In the following example, the reactants were either acquired from a commercial source or prepared as follows:

A) Carbon nanotubes (CNTs) were obtained from Shenzhen Nanotech Port Co., Ltd. (L-SWNT, diameter <2 nm, length 5-15 μm, 50% SWCNT, 40% MWCNT, <5% amorphous carbon). The CNTs were oxidatively shortened and purified as well as thermally decarboxylated prior to being functionalized. (a) Shortening of CNT: Shortening of CNTs increase the solubility of such material. CNTs (1 g) were suspended in three M $HNO_{3,aq}$ (50 mL), sonicated for 5 minutes at room temperature, and then refluxed for 60 hours. The CNTs were filtered off (PTFE membrane filter, 0.45 μm) and washed with deionized water to give shortened CNTs substituted at the tip and surface of this sidewall with carboxylic acid groups. Heating of the oxidized CNTs at 450° C. in a flow of dry $N_2$ for 3-4 hours quantitatively removes all carboxylic acid groups. This procedure shortened/cut the carbon nanotube from 5-15 microns to 300-500 nanometer. These shortened carbon nanotubes were characterized as follows:

B) High Resolution Transmission Electron Microscopy (HR-TEM) was performed on a JEOL 2010F FEG TEM/STEM at 200 kV. Dilute solutions of CNTs in THF were dropped onto a carbon-coated copper grid and the solvent was allowed to evaporate. Thermal gravimetric analysis with mass spectrometric detection of evolved gases was conducted on a Mettler Toledo TGA SDTA 851e that was attached to a Pfeiffer Vacuum Thermostar™ mass spectrometer (1-300 amu) via a thin glass capillary. Helium (99.99%) was used to purge the system with a flow rate of 60 mL/min. Samples were held at 25° C. for 30 minutes before being heated to 1000° C. or 550° C. at rates of 2° C./min or 5° C./min. A mass range between 14 m/z and 300 m/z was constantly scanned. UV-VIS spectra of solutions in different solvents were recorded on a Varian Cary 50. FT-IR measurements were performed on a Bruker Vector 22. Powder X-Ray Diffraction (XRD) measurements were run on a Bruker D8 Discover diffractometer equipped with a GADDS 2D-detector and operated at 40 kV and 40 mA. CuKα1 radiation (λ=1.54187 Å) was used and the initial beam diameter was 0.5 mm. Spectra were evaluated in EVA and plotted with Origin. Raman spectras were recorded on a Renshaw in Via Raman Spectroscopy instrument at an excitation wavelength of 633 nm and 50% power.

C) Malonate esters used to functionalize the short single-walled carbon nanotubes were either acquired from a commercial source and used without purification or were synthesized as follows:

C-1—Synthesis of dihexadecyl malonate: $H_2SO_4$ (conc) (0.1 mL, 0.0036 mol % was slowly added to a mixture of dimethyl malonate (2 g, 0.015 mol) and hexadecanol (15 mL, 0.061 mol) and the mixture was heated at reflux until all dimethyl malonate was converted according to TLC (approximately 4 days). The product mixture was dissolved in dichloromethane (DCM), extracted with water (3 times) and dried over $MgSO_4$. An analytically pure sample was obtained by column chromatography on silica gel using a 1:9 mixture of ethylacetate/hexane. Yield: 5.5 g (65.7%), see JP 57067510.

C-2—Synthesis of 2-bromo dihexadecyl malonate: p-Toluene sulfonic acid monohydrate (1.03 g, 0.0054 mol) and N-bromosuccinimide (0.64 g, 0.0035 mol) were slowly added to a stirred solution of dihexadecyl malonate (2 g, 0.0036 mol) in $CH_3CN$ (20 mL). The resulting mixture was heated at reflux for 2 hours, evaporated and dissolved in dichloromethane. The organic layer was washed with $H_2O$, dried over $MgSO_4$, and concentrated. An analytically pure sample was obtained by column chromatography on silica gel using a 1:4 mixture of ethylacetate/hexane. Yield: 1.8 g, 78.9%.

See: Menger, F. M.; Johnston, D. E., Jr., Specific enzyme-induced decapsulation. Journal of the American Chemical Society (1991), 113(14), 5467-8.

C-3—Synthesis of bis(2-hexyldecyl malonate): $H_2SO_4$ (conc) (0.1 mL, 0.0036 mol) was slowly added to a mixture of dimethyl malonate (3 g, 0.022 mol) and 2-hexyl-1-decanol (19.7 mL, 0.068 mol) and the mixture was heated at reflux until all dimethyl malonate was converted according to TLC (approximately 6 days). The product mixture was dissolved in dichlormethane (DCM), extracted with water (3 times) and dried over $MgSO_4$. An analytically pure sample was obtained by column chromatography on silica gel using a 1.5:8.5 mixture of ethylacetate/hexane. Yield: 8.1 g (64.5%).

C-4—Synthesis of bis(2-hexyldecyl)-2-bromomalonate): p-Toluene sulfonic acid monohydrate (2.80 g, 0.014 mol) and N-bromosuccinimide (1.74 g, 0.009 mol) were slowly added to a stirred solution of bis(2-hexadecyl malonate) (5.4 g, 0.009 mol) in $CH_3CH$ (30 mL). The resulting mixture was heated at reflux for 2 hours, evaporated and dissolved in dichloromethane. The organic layer was washed with $H_2O$, dried over $MgSO_4$ and concentrated. An analytically pure sample was obtained by column chromatography on silica gel using a 1:4 mixture of ethylacetate/hexane. Yield: 4.3 g (70.5%).

C-5—Synthesis of dimethyl-2-bromomalonate): p-Toluene sulfonic acid monohydrate (11.0 g, 0.057 mol) and N-bromosuccinimide (1.74 g, 0.009 mol) were slowly added to a stirred solution of dimethyl malonate (5.0 g, 0.037 mol) in $CH_3CH$ (30 mL). The resulting mixture was heated at reflux for 2 hours, evaporated and dissolved in dichloromethane. The organic layer was washed with $H_2O$, dried over MgSO$_4$ and concentrated. An analytically pure sample was obtained by column chromatography on silica gel using a 1:4 mixture of ethylacetate/hexane. Yield: 6.0 g (76.0%).

See: (1) Wolfe, Saul; Ro, Stephen; Kim, Chan-Kyung; Shi, Zheng, Canadian Journal of Chemistry (2001), 79(8), 1238-1258; (2) Matsumoto, Kiyoshi; Uchida, Takane; Yagi, Yoshiko; Tahara, Hiroshi; Acheson, R. Morrin, Heterocycles (1985), 23(8), 2041-3.

EXAMPLES

1. Preparation of CNT>C(COOC$_{16}$H$_{33}$)$_2$ (CNT-16): Shortened and decarboxylated CNT compound (150 mg) was suspended in 50 mL of dry ortho-dichlorobenzene (o-DCB) by sonication (5 minutes). 2-Bromo dihexadecyl malonate (0.95 g, 1.5 mmol) and 1,8-diazabicyclo[5.4.0]undecene (DBU) (0.45 g, 3.0 mmol) were added and the mixture was allowed to react in a sonicator at 60° C. Three days after the initial batch of reactants was combined, additional amounts of 2-bromo dihexadecyl malonate (0.95 g, 1.5 mmol) and 1,8-diazabicyclo[5.4.0]undecene (DBU) (0.45 g, 3.0 mmol) were added with the reaction being run for a total of 9 days. The reaction mixture was cooled to about 25° C. and filtered through a 0.45 μm PTFE filter. A small amount of CNT compound passed through this membrane filter and was collected by twice filtering the filtrate through a 0.1 μm VCTP membrane filter. The filter residue was washed with ethanol until the filtrate became clear to give 29 mg of CNT compound after drying in vacuum (<10$^{-2}$ mbar) for 6 hours. The first filter residue (0.45μ PTFE filter) was suspended in ethanol and collected by centrifugation. This process was repeated 5 times to remove all organic contaminants. Finally, the obtained CNT compound was suspended in dichloromethane, sonication and heating was avoided, filtered off by passing the mixture through a 0.45 μm filter and dried in vacuum (<10$^{-2}$ mbar) for 6 hours. Yield 95 mg. IR (KBi, cm$^{-1}$): 1740 (C=0), 2923 2959 (CH2). Raman (LL=633, P=50%, cm$^{-1}$): 1334, 1587, 2625. Estimated number of ligands based on TGA is 1 per 22 carbon atoms of CNT.

II. Preparation of CNT>C[(COOCH$_2$CH(C$_6$H$_{13}$) (C$_8$H$_{17}$)]$_2$ (CNT-6,10): Shortened and decarboxylated CNT compound (50 mg) was suspended in 20 mL of dry ortho-dichlorobenzene (o-DCB) by sonication (5 minutes). Bis-(2-hexyldecyl) 2-bromomalonate (0.64 g, 1.0 mmol) and 1,8-diazabicyclo[5.4.0]undecene (DBU) (0.31 g, 2.0 mmol) were added and the mixture was allowed to react in a sonicator at 60° C. Additional amounts of di(2-hexyldecyl) 2-bromomalonate (0.64 g, 1.0 mmol) and 1,8-diazabicyclo[5.4.0]undecene (DBU) (0.31 g, 2.0 mmol) were added after 3 and 6 days of reaction with the reaction being run for a total of 9 days. The reaction mixture was cooled to about 25° C. and filtered through a 0.45 μm PTFE filter. A small amount of CNT compound passed through this membrane filter. The filter residue was washed with ethanol until the filtrate became clear to give 7 mg of CNT compound after drying in vacuum (<10$^{-2}$ mbar) for 6 hours.

The first filter residue (0.45 μm PTFE filter) was suspended in ethanol and collected by centrifugation. This process was repeated 5 times to remove all organic contaminants. Finally, the obtained CNT compound was suspended in DCM, sonication and heating was avoided, filtered off by passing the mixture through a 0.45 μm filter and dried in vacuum (<10$^{-2}$ mbar) for 6 hours. Yield: 63 to mg. IR (KBr, cm$^{-1}$): 1744 (C=O), 2920, 2850 (CH2). Raman (LL=633, P=50%, cm$^{-1}$): 1330, 1591, 2617. Estimated number of ligands based on TGA is 1 per 480 C-atoms of CNT.

III. Synthesis of CNT>C[CONH-Ph(OC$_{12}$)$_3$]$_2$ (CNT-NPhC$_{12}$): Shortened and decarboxylated CNT compound (80 mg) was suspended in 20 mL of dry ortho-dichlorobenzene (o-DCB) by sonication (5 minutes). Dimethyl-2-bromomalonate (0.32 g, 1.5 mmol) and 1,8-diazabicyclo[5.4.0] undecene (DBU) (0.46 g, 3.0 mmole) were added and the mixture was allowed to react in a sonicator at 60° C. Additional amounts of dimethyl-2-bromomalonate (0.32 g, 1.5 mmol) and 1,8-diazabicyclo[5.4.0] undecene (DBU) (0.46 g, 3.0 mmol) were added after 3 days of the 5 day reaction period. At the end of this period, 3,4,5-tris(dodecyloxy) aniline (2.6 g, 4 mmol) was gradually added to the reaction mixture over 5 days and the mixture was sonicated at 60° C. for another 5 days. The reaction mixture was cooled to 25° C. and filtered through a 0.46 μm PTFE filter. No CNT compound passed through this membrane filter because larger aggregates than for the previous CNT compounds were formed. The filter residue was suspended in ethanol and collected by centrifugation. This process was repeated 5 times to remove all organic contaminants. Finally, the obtained CNT compound was suspended in DCM, sonication and heating was avoided, filtered off by passing the mixture through a 0.45 μm filter and dried in a vacuum (<10$^{-2}$ mbar) for 6 hours. Yield: 131 mg. IR (KBr, cm$^{-1}$): 1745 (CONH, 2921, 2851 (CH$_2$), 3441 (NH). Raman (LL=633, P=50%, cm$^{-1}$): 1334, 1590, 2631. Estimated number of ligands based on TGA is 1 per 900 C-atoms of CNT.

The solubilities of the CNT-16 and CNT-6,10 materials in different solvents was investigated. Solubility is difficult to define for CNT materials because of their large size and strong van-de-Waals interactions (aggregation). All solubility measurements reported here are based on UV/VIS adsorption measurements of saturated solutions based on a calibration curve obtained in toluene solution.

For comparison purposes two additional batches of CNT-6,10 materials were made but not employing the multiple addition technique outlined in Example II.

In Comparison I the shortened and decarboxylated CNT compound (50 mg) was suspended in 200 ml of dry orthodichlorobenzene (o-DCB) by sonication (5 minutes). Bis-(2 hexyldecyl) 2-bromomalonate (0.64 g, 1.0 mmol) and 1,8-diazabicyclo[5.4.0]undecene (DBU) (0.31 g, 2.0 mmol) were added once and the mixture was allowed to react in a sonicator at 60° C. for 4 days.

In Comparison II the shortened and decarboxylated CNT compound (50 mg) was suspended in 20 ml of dry ortho-dichlorobenzene (o-DCB) by sonication (5 minutes). Bis-(2 hexyldecyl) 2-bromomalonate (1.28 g, 2 mmol) and 1,8-diazabicyclo [5.4.0] undecene (DBU) (0.62 g, 4.0 mmol) were added once and the mixture was allowed to react in a sonicator 60° C. for 4 days.

In both Comparison I and Comparison II, the product purification technique recited in Example II was employed.

Adsorbance values (at a recited wavelength) of CNTs in different solvents at room temperature after centrifugation to remove suspended solids is reported in Table 1. The values in parentheses are the calculated concentration of the solutions in mg of CNT/dm$^3$ of solvent.

TABLE 1

| Solvent | CNT-16 (Example I) | CNT-6,10 (Example II) | CNT-6,10 Comparison I | CNT-6,10 Comparison II |
|---|---|---|---|---|
| THF (350 nm) | 0.787 (40.36) | 0.381 (19.54) | | |

TABLE 1-continued

| Solvent | CNT-16 (Example I) | CNT-6,10 (Example II) | CNT-6,10 Comparison I | CNT-6,10 Comparison II |
|---|---|---|---|---|
| CHCl$_3$ | 1.585 | 1.212 | 0.634 | 0.630 |
| (350 nm) | (81.28) | (62.15) | (29.72) | (29.58) |
| DCM (350 nm) | n.a. | n.a. | | |
| Toluene | 0.346 | 0.516 | | |
| (350 nm) | (17.74) | (26.46) | | |
| Hexane | 0.043 | 0.110 | | |
| (350 nm) | (2.21) | (5.64) | | |
| Special Oil | 0.098 | 0.158 | | |
| (400 nm) | (5.76) | (9.29) | | |
| 5W-30 | 0.866 | 0.349 | | |
| (400 nm) | (50.94) | (20.53) | | |

Solubility of the CNT precursor, the decarboxylate short single-walled carbon nanotube before the functionalization reaction, in chloroform is 1.07 mg/dm$^3$. Consequently, the functionalization reaction increased their solubility by a factor of up to 89 as read directly from the calibration curve or by a factor of 76 based on direct calibration from peak intensity.

As can be seen by considering CNT-6,10 product of Example II versus the CNT-6,10 product of Comparison I and Comparison II, functionalization employing a single addition step (Comparison I) and regardless of whether it employs in that single addition step even a double amount of reactant (Comparison II), the products exhibit an adsorption of 0.634 and 0.630, respectively, while CNT-6,10 made using multiple additions of the malonate/DBU reactants exhibits an adsorption of 1.212, double the value, indicative of an at least doubling of the level of substitution achieved by the multiple addition process versus the single addition process exemplary of the techniques used in the prior art.

What is claimed is:

1. A method for functionalizing carbon nanostructure materials comprising: (1) suspending a carbon nanostructure material in a chlorinated benzene solvent; and (2) adding to the suspension of (1), in at least 3 additions over a reaction time ranging from 6 to 4 days between each addition, materials of the formula:

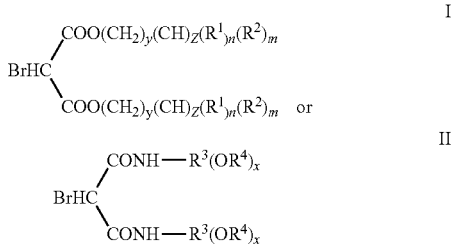

wherein $R^1$ and $R^2$ are the same or different hydrogen or $C_1$ to $C_{18}$ alkyl groups provided at least one of $R^1$ and $R^2$ is not hydrogen, y is 0 to 10, Z is 1, n and m are each 1, wherein n+m = 2, $R^3$ is a $C_1$ to $C_{15}$ alkyl or $C_6$ to $C_{10}$ aryl group, $R^4$ is a $C_2$ to $C_{14}$ alkyl group, $C_6$ to $C_{10}$ aryl, $C_1$ to $C_{10}$ alkylaryl or $C_1$ to $C_{10}$ arylalkyl group, and x is an integer ranging from 0 to up to the replaceable valence of the $R^3$ group, and 1,8-diazabicyclo[5.4.0] undecene (DBU), wherein the resulting functionalized carbon nanostructure material has at least twice the level of functionalization as compared to functionalized carbon nanostructure material made using the same carbon nanostructure material and material of formula I or II and DBU when the materials of formula I or II and DBU are added to the carbon nanostructure material all at once in a single addition.

2. The method of claim 1 wherein the carbon nanostructure material is single-walled carbon nanotubes.

3. The method of claim 2 wherein the single-walled carbon nanotubes are short single-walled nanotubes having a length between 1 to 10 microns and a diameter between 0.01 to 50 nanometers.

4. The method of claim 1, 2 or 3 wherein the carbon nanostructure material has had its surface decarboxylated.

5. The method of claim 1 wherein the interval between additions is at least twelve hours to four days.

6. The method of claim 1, 2, 3, or 5, wherein the temperature is held at from 40 to 70° C. during the addition step and for one to four days following the final addition of the material to the suspended carbon nanostructure materials.

* * * * *